2,826,824
DRYING METHOD
Bowen Campbell, Des Moines, Iowa

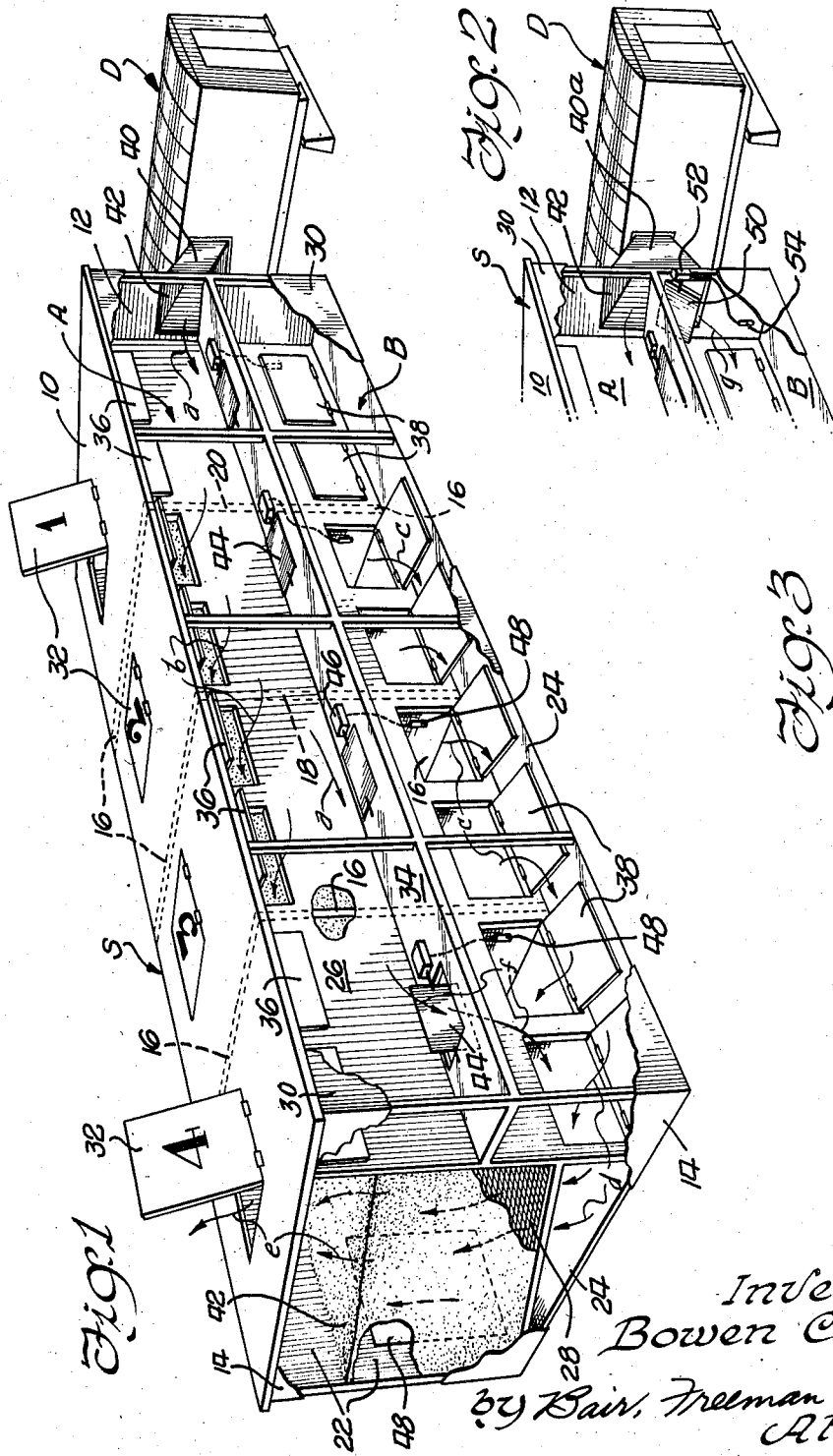

Application February 14, 1955, Serial No. 487,941

8 Claims. (Cl. 34—34)

My present invention relates to a method for drying grain or other vegetable materials and contemplates a slow drying process by means of which surface moisture may be initially removed and thereafter moisture may be removed from the interior of the grain or vegetable material.

One object of the invention is to provide an improvement on the method shown and claimed in my Patent No. 2,241,375, which is of considerable advantage in wet years when grain, corn or other vegetable material has excessive moisture content and there is danger from field damage in the fall caused by early freezing weather. In years when, for various reasons, the dehydrating capacity of the drying plant disclosed in my above noted patent is adequate to use the method claimed therein, the present method is unnecessary. In wet years, however, it is desirable to hasten the initial or surface drying operation, which may be accomplished by the method herein disclosed.

Still another object of the present invention, therefore, is the provision of a new and improved method and means for continuously drying quantities of vegetable materials, and particularly grains and seed corn, which normally need a slow drying process in order to properly preserve the inherent characteristics of the material, but in which the process can be somewhat hastened to advantage when excessive moisture is present in the materials being dried.

Still another object is to modify the method disclosed in my prior patent to the extent of bypassing some of the original drying air directly into a bin of fresh grain instead of passing all the air through partially dried grain before it enters the bin of fresh grain, thereby providing initial drying air of greater temperature and less moisture than when the method shown in my prior patent is practiced, the new method also effecting an increase in velocity of the initial drying air through the fresh grain.

Still a further object is to utilize my drying process in connection with a portable heater and blower such as shown in my prior Patents Nos. 2,276,715, 2,316,559, and 2,541,332 in such manner that bins may be erected in localities most convenient to the source of production of the corn or grain and a single mechanical apparatus comprising the heater and blower transported from one to another whenever it is necessary to employ the drying process.

With these and other objects in view, my invention consists in the construction, arrangement and combination of the various parts of an apparatus and in the method steps herein disclosed whereby the objects contemplated are attained as hereinafter more fully set forth, pointed out in my claims and illustrated in detail on the accompanying drawing, wherein:

Fig. 1 is a perspective view of an apparatus suitable for the operation of my method with portions of the covering walls broken away to show internal details;

Fig. 2 is a similar perspective view of a portion thereof showing a modification; and Fig. 3 is a chart showing the sequence of operations of the apparatus in Fig. 1 according to my method.

In the drying of vegetable matter, and particularly grains which are to be used for seed, it is necessary that the matter be dried slowly, uniformly and carefully in order that the inherent qualities are not destroyed, but rendered only inert until such later time as they may be needed. In drying processes of this sort the vegetable matter to be dried, such as corn or other grain, is frequently moist upon the surface and before any permanent drying is done it is necessary first to remove the surface moisture which can be done safely at a relatively rapid rate.

After the surface moisture has been removed the subsequent removal of moisture within the grain must take place at a relatively slower rate so as not to destroy such characteristics as germinating substances within the grain. It is true, moreover, that once the surface moisture has been removed from a grain, such as corn, and the kernels partly dried, the drying process even though continued at a temperature considerably higher than that used in initially removing the surface moisture, will produce said relatively slower rate of moisture removal because of having to penetrate below the surface, without fear of damage to grain germination. For this reason, a multi-stage process lends itself very readily to the production of properly dried grains.

In contemplating the production of a method suitable for this purpose, it is likewise desirable to have a method which is continuous. Although continuous methods of drying are comparatively old, these methods in general can be employed only by the installation of more or less complicated machinery, or in commercial plants where only the most modern conveniences can be employed. In the present invention a continuous process is disclosed which is extremely simple and can be employed with a minimum of expense almost anywhere on a farm where convenient to the fields where the grain is grown. The process and the apparatus by means of which it is performed is of an extremely simple character easily understood by the average farmer and readily available to even very small farms where relatively little capital is available.

While a considerable number of bins may be utilized in practicing the invention, an arrangement of four bins only has been elected to simplify the description. The apparatus disclosed therefore, illustrating the operation of my device, comprises in general a well-constructed, elongated shed indicated generally by the reference character S. The shed has a top 10, end walls 12 and 14, a back wall 22 and a bottom 24. The shed S may be made of suitable framing, illustrated on the drawings but not numbered, and further includes a front wall 30 and a vertical partition 26 extending longitudinally of the shed. Most of the end and front walls 14 and 30 have been broken away to illustrate the apparatus in better detail.

The four bins above referred to have false bottoms 28 formed of slats or screening. Access doors 32 and 48 are provided for filling and emptying each of the four bins. The doors 32 are part of the top 10 and are numbered 1, 2, 3 and 4 to indicate the bins accordingly.

Between the partition 26 and the front wall 30 are a supply duct indicated as A and a transfer duct B and provided by reason of a horizontal partition 34 constructed in the shed S between 26 and 30. The bins are adapted be filled with grain such as corn (on the ear if desired) and to have the grain or corn dried while in the bins, as will hereinafter appear.

For drying purposes there is supplied a dryer unit D consisting of a heating unit and a blower such as shown in any one of my last three above mentioned prior patents and this unit forces hot dry air into the bins, as will hereinafter appear. The dryer unit D may be stationary as disclosed when conditions warrant, or portable so that it can be transported from farm to farm as required.

The shed S itself may be of either wood or metal construction, the doors 32 being substantially airtight, of course, and they also serve as exhaust doors for the air used in drying, as will become apparent as the description proceeds. The unloading doors 48 are part of the back wall 22 as shown in the brokenaway part at the left end of Fig. 1.

The drying unit D has a hot air discharge duct 40 connected with an opening 42 leading into the duct A. Each of the bins 1, 2, 3 and 4 has an openable door 36 in the partition 26 adjacent the top of the bin and each bin has an air receiving compartment 24 below its screened bottom 28 controlled by doors 38 also in the partition 26.

The lower duct B is used only to interconnect one bin with another, but the upper duct A is connected to the combined heater and blower or drying unit D and is used to conduct dry heated air from the blower to the shed S. The chart in Fig. 3 includes designations F, U and D which indicate respectively;

F—bin being emptied and refilled
U—air up through bin
D—air down through bin

Assuming that the grain indicated at 42 in bin No. 4 has been placed therein according to operation 4 of Fig. 3 and operation 5 is now taking place so that the grain is partially dried, and that bins 2 and 3 have been filled with fresh grain in operations 2 and 3 respectively, all of the airtight doors 36 and 38 for bin No. 1 are closed, thus cutting this bin off from the ducts A and B so that it can be filled with fresh grain. Therefore, the filling and emptying doors 32 and 48 for bin No. 1 may be opened without impairing the efficiency of the drying apparatus as far as the other three bins is concerned. By use of the air-tight doors the apparatus can be kept in continuous operation throughout the drying season.

Bins 2 and 3 are supplied with heated air as indicated by the arrows $a$ and $b$ by opening their doors 36. This air of course is heated, usually to a temperature of 100° F., the temperature being controlled by a suitable thermostat in the dryer D. The heated air comes direct from the dryer D to the upper duct A and is forced down through bins 2 and 3 which have already partly dried grain therein. Bin No. 2 has had one passage of air upwardly (operation 3) and two downwardly (operation 3) and two downwardly (operations 4 and 5), and bin No. 3 has had one passage of air upwardly (operation 4) and one downwardly (operation 5), operation 5 being at present in process. As the air leaves bins 2 and 3 through their opened doors 38, it is directed into the lower duct B and is still only partially saturated from the moisture removed from the grain in bins 2 and 3 as indicated by the arrows $c$.

In bin No. 4 the partially saturated air from the duct B enters through its opened doors 38 as indicated by the arrows $d$, passing into the space 24 of bin No. 4 and upwardly through the fresh grain therein as indicated by the arrows $e$ and is discharged to atmosphere through the door 32 of bin No. 4. Thus, the air passing through bin No. 4 has twice the velocity of that passing through bins 2 and 3, a reduced air temperature (about 85° or 90° F.) and is exhausted at maximum saturation.

To keep the plant in continuous operation, the operator must of course fill the bins 1, 2, 3 and 4 successively and by the time he reaches the fifth filling (which is bin No. 1 for the second time), the plant will be in full operation as illustrated in Fig. 1. After operation 5 continuous operation of the plant is had with all four bins continuously participating as indicated in operations 5 through 20.

The operation of the plant as above described and the sequence of operations just explained apply to my prior Patent No. 2,241,375. The advantages thereof may be listed as follows:

(1) The hottest air comes first in contact with the driest grain giving maximum drying results during the latter part of the drying period when the grain is hardest to dry.

(2) Maximum speed and efficiency is accomplished by ($a$) reversing the direction of the air through the wettest grain and by ($b$) using all fresh air in the operation of the plant and recirculating none.

(3) The germination and vitality of the grain is less likely to be damaged because the air which passes over the grain when it has the highest moisture content and is most susceptible to damage is at a lower temperature than 100° F. because it has already gone through the partly dried bins.

(4) The air velocity over the wettest grain is high where it will do the most good since surface moisture is still present.

(5) This process permits some heated air to be forced through a bin while it is being filled to prevent spoiling and to hasten the drying. This is accomplished by partially opening the doors 36 and 38 of bin No. 1, for instance, while it is being filled, but of course this reduces somewhat the supply of air to bins 2 and 3.

My present improvement contemplates an additional method step to speed up the drying process by increasing the temperature in the transfer air duct B by by-passing some of the original drying air directly into it instead of taking all of it first through bins 2 and 3 in Fig. 1. Normally the air temperature in the duct B is 85° to 90° F. and this can be brought up to, for instance 100° F. which speeds up the drying in bin No. 4 when it is freshly filled with high moisture content grain. This is accomplished by providing dampers 44 in the horizontal partition 34 which may be either manually controlled or automatically controlled.

By way of illustration for automatic control, I show damper motors 46 for the dampers 44 energized by temperature responsive bulbs 48, which may be set at the desired temperature, for instance, 100° F., to by-pass just the right amount of air through the dampers 44 so that the air entering through the opened doors 38 to the bin No. 4 is at 100° F. While bin No. 4 is undergoing the initial drying operation as just described the dampers 44 from bins 1, 2, and 3 would be latched closed so that the bulb 48 for the bin 4 would be the only one operating its damper to regulate in accordance with requirements to keep the air entering as indicated by the arrows $f$ and $d$ at 100° F. This temperature, while it is higher than usually used, is still low enough to protect germination where the moisture content of the grain is high. Obviously, the higher the moisture content, the higher the temperature can be.

Operation of the plant as described in the two preceding paragraphs of course reduces the drying efficiency of the system to some extent but gains in drying speed which is of considerable advantage in wet years when the grain is excessively wet and there is danger of field damage in the fall from freezing weather. 110° air from the dryer D is perfectly safe for drying grain with high moisture content and there is no purpose in letting the temperature of the air entering bin No. 4 go below 100° if maximum drying capacity is desired at some sacrifice of operating efficiency.

This 110° air which can be by-passed through the dampers 44 into the transfer duct B, when automatically controlled, can be handled on each individual bin as described or by one thermostat in the transfer duct B, or can be by-passed directly from the blower of the dryer D as in the modification shown in Fig. 2 wherein the duct 40 of Fig. 1 is modified as shown at 40a to both discharge through the opening 42 into the duct A and through a damper 50 when opened into the duct B, as indicated by the arrow g. The damper 50 may be manually controlled as to its position, or may be controlled by a damper motor 52 having a temperature responsive element 54 for operating it. In this case, the damper motor could be set for operation at some temperature intermediate 90° and 110°, such as 105°, and thus the 105° air mixed with the 85° or 90° air coming from bins 2 and 3 would provide a mixture approximating 100°. Other variations obviously are possible to secure similar desired results.

The additional advantages offered by my improvement over my former patent are desirable of obtainment only in the case of exceptionally wet grain where it is desirable to increase the drying action during the initial period and is possible only at some sacrifice to efficiency in the final drying of the grain as in bins 2 and 3. The air circulated upwardly through the initial grain in bin 4 has its temperature increased and also its volume whereas the volume of air passing downwardly through bins 2 and 3 is proportionally reduced. The arrangement, however, makes it possible to handle in the one plant grain having extremely high moisture content as well as all intermediate moisture content values by regulating the by-passed air through the dampers 44 to mix with the 85° to 90° air from bins 2 and 3 so that any desired temperature of air between 90° and 110° can be supplied to the initial charge of grain in the bin 4.

Throughout the specification I have referred specifically to bins 1, 2, 3 and 4, as loaded and adjusted as in Fig. 1 whereas the loading and adjustment is periodically changed according to the chart shown in Fig. 3, but in all cases the same conditions and adjustments are used for the appropriate bins in an obvious manner.

Each period of drying continues for about one-third of the total drying time for a single bin so that during the process, once it has been fully started, as at operation 4 in Fig. 3, the grain in each of the three bins is dried during a full period. During the progressive drying of grain in three bins there is always a fourth bin closed off in order that its dried contents may be removed and replaced with undried grain.

By carrying out the process as disclosed, it is apparent that there has been provided a continuous method for drying grain by subjecting it to successive different drying conditions—that is to say, using a high velocity of relatively hot air for the initial drying and a slow velocity of relatively hotter air for the final drying. Where the moisture content is excessive, the high velocity is increased and the temperature of the hotter air is likewise increased whereas the slow velocity of relatively hot air for the final drying is decreased and the proportions of increase and decrease can be regulated either by hand or by the thermostatic means 46—48 or 52—54. The process can be continued until the available stock of grain is completely processed and then the portable blower and heater or dryer D removed and transported to another locality and there attached to a shed of similar construction where the driving process may be recommenced.

Some changes may be made in the construction and arrangement of the apparatus disclosed and the steps of the process may be varied to some extent without departing from the real spirit and purpose of my invention. Accordingly it is my intention to cover by my claims any modified method or methods which may be considered mechanical equivalents which may be reasonably included within their scope.

I claim as my invention:

1. A method of drying grain or the like by using freshly heated air supplied at a predetermined velocity comprising segregating the grain into lots, preliminarily drying the surface moisture from the grain in two of the lots by passing moist, heated air therethrough passing a portion of said freshly heated air downward through the partially dried grain in said two lots so that substantially one-half of said portion will pass through each lot at a corresponding velocity enabling it to draw the internal moisture from the grain, then passing said portion of air from both said first two lots, now partially saturated, and also passing a second portion of freshly heated air upwards through a third lot of undried grain at a corresponding increase in velocity with respect to its velocity through said first two lots for drying the surface moisture from grain in the last named lot, and then exhausting the saturated air from the last lot.

2. A method of drying grain by use of a volume of dry heated air comprising segregating the grain into three lots of substantially equal quantities, passing part of said volume of dry heated air initially downward through two of said lots at a relatively slow velocity, and then after they are partially dried passing the remainder of said volume of dry heated air and the partially moistened air from said two lots mixed together upward through the remaining third lot at relatively higher velocity so that the partially cooled and moistened air and said remainder of said volume of dry heated air may extract the surface moisture from the third lot.

3. A continuous method of drying vegetable material by the use of a constant flow of dry heated air comprising segregating the material into lots of substantially equal quantities, passing one portion of the dry heated air through two of said lots of material in parallel whereby the air flows at one velocity and so that the hottest air extracts the internal moisture from said two lots, then passing the partially moistened air from said two lots through a third lot whereby the air then flows at relatively higher velocity so that the partially cooled and moistened air may extract the surface moisture from said third lot, and at the same time mixing the remainder portion of the dry heated air with the partially cooled and moistened air removed from the two lots and directing this mixture to said third lot to more effectively extract the surface moisture from said third lot when it has excessively high moisture content.

4. A method of drying grain and the like by using a constant flow of dry heated air comprising segregating the material into lots, passing one portion of the dry heated air through a plurality of said lots in parallel so that the hottest air travels at one velocity therethrough and extracts the internal moisture from the grain thereof, then passing the partially moistened air from said plurality of lots through only one of said lots whereby the air then flows at relatively higher velocity and the partially cooled and moistened air may extract the surface moisture from the grain of said one lot, and at the same time mixing the remainder portion of the dry heated air with the partially cooled and moistened air removed from the plurality of lots and directing this mixture to said one lot to more effectively extract the surface moisture from the grain thereof when it has excessively high moisture content.

5. A continuous method of drying vegetable material by use of a constant flow of freshly heated air supplied at a predetermined velocity comprising segregating the material into lots of substantially equal quantities and areas, preliminarily drying the surface moisture from the material in two of said lots by passing moist heated air upward therethrough, passing one portion of said freshly heated air downward through the partially dried material in said two lots so that substantially one-half will pass through each lot at a corresponding velocity enabling it to draw the internal moisture from the material, then passing said one portion of air from both said first two lots, now partially saturated, and the remainder of said freshly heated air upward through a third lot of undried material at a corresponding increase in velocity with respect to its velocity through said first two lots for drying the surface moisture from material in the last named lot, and then exhausting the saturated air from the last lot.

6. A continuous method of drying grain by using a flow of dry heated air comprising segregating the grain into lots of substantially equal quantities, preliminarily drying the surface moisture from two of the lots by passing moist heated air therethrough, passing some of said dry heated air through said two lots at relatively low velocity for a third of a period of the time necessary to completely dry one said lot to extract the internal moisture therefrom at a relatively slow rate, passing the air therefrom and at the same time mixing another portion of the dry heated air with the partially cooled and moistened air removed from the two lots and directing this mixture through said third lot to an exhaust to more effectively extract the surface moisture from said third lot, then passing still another portion of said dry heated air simultaneously through one of said first two lots and said third lot for a third of said period of time meanwhile passing the air therefrom and at the same time mixing a further portion of the dry heated air with the partially cooled and moistened air removed from the second and third lots and directing this mixture through a fourth lot to an exhaust to more effectively extract the surface moisture therefrom, and then passing still a further portion of said dry heated air simultaneously through said third and fourth lots before passing the air therefrom and at the same time mixing an additional portion of the dry heated air with the partially cooled and moistened air removed from the third and fourth lots and directing this mixture through a fifth lot for a third of said period of time whereby once the process is started each lot in its turn is given a full period of drying time.

7. A continuous method for drying grain by use of a constant flow of dry heated air comprising segregating the grain into lots of substantially equal quantities and areas, preliminarily drying the surface moisture from two of the lots by passing moist heated air therethrough, passing some of said dry heated air downwardly through said two lots for a third of a period of time necessary to completely dry one lot at relatively low velocity to extract the internal moisture at a relatively slow rate, passing the air therefrom and at the same time mixing another portion of said dry heated air with the partially cool and moistened air removed from the two lots and directing this mixture upwardly through a third lot of undried grain to an exhaust at a relatively higher velocity to extract the surface moisture therefrom, then passing still another portion of said dry heated air downward through one of said first lots and said third lot for a third of said period of time, meanwhile passing the air therefrom and at the same time mixing a further portion of the dry heated air with the partially cooled and moistened air removed from the second and third lots and directing this mixture upward through a fourth lot to an exhaust to remove the surface moisture, then passing still a further portion of said dry heated air downward through said third and fourth lots and at the same time mixing an additional portion of said dry heated air with the partially cooled and moistened air removed from said third and fourth lots and directing this mixture upward through a fifth lot for a third of said period of time whereby once the process is started each lot is given in its turn three successive periods of one-third of said drying time.

8. A continuous method of drying vegetable material by use of a constant flow of dry heated air supplied at a substantially fixed velocity comprising segregating the material into lots of substantially equal quantities, preliminarily drying the surface moisture from material in two of the lots by passing moist heated air therethrough, passing less than one-half of the flow of dry heated air for a period of time through both of said two lots of partially dried material to reduce the air velocity and draw internal moisture from the material at a relatively slow rate and simultaneously passing all air from both said lots and air mixed therewith from the remaining portion of the dry heated air with the partially cooled and moistened air removed from said two lots and directing this mixture through a third lot of undried material having excessive moisture to an exhaust for the first part of the period thereby relatively increasing the air velocity and temperature through said third lot for drying surface moisture from said third lot; and then simultaneously passing said air from the second and third lots plus additional dry heated air mixed therewith through a fourth lot of undried material having excessive moisture during another part of the period so that two lots thereof will be partially dried and two lots completely dried and thereafter as the process is continued all lots will be completely dried.

References Cited in the file of this patent

UNITED STATES PATENTS

| | | |
|---|---|---|
| 1,900,974 | Bozarth | Mar. 14, 1933 |
| 2,241,375 | Campbell | May 13, 1941 |